(12) United States Patent
Yeh

(10) Patent No.: US 11,581,730 B2
(45) Date of Patent: Feb. 14, 2023

(54) POWER SUPPLY DEVICE WITH MULTIPLE OUTPUTS AND POWER ALLOCATION CONTROL METHOD THEREOF

(71) Applicant: ACBEL POLYTECH INC., New Taipei (TW)

(72) Inventor: Chia-An Yeh, New Taipei (TW)

(73) Assignee: ACBEL POLYTECH INC., New Taipei (TW)

( * ) Notice: Subject to any disclaimer, the term of this patent is extended or adjusted under 35 U.S.C. 154(b) by 12 days.

(21) Appl. No.: 17/231,139

(22) Filed: Apr. 15, 2021

(65) Prior Publication Data

US 2022/0337056 A1 Oct. 20, 2022

(51) Int. Cl.
*H02J 1/10* (2006.01)
*H02J 1/08* (2006.01)

(52) U.S. Cl.
CPC .............. *H02J 1/106* (2020.01); *H02J 1/102* (2013.01); *H02J 1/084* (2020.01)

(58) Field of Classification Search
CPC ......... H02J 1/084–086; H02J 1/10–109; H02J 9/061; H02M 1/008; G06F 1/263
See application file for complete search history.

(56) References Cited

U.S. PATENT DOCUMENTS

| | | | | |
|---|---|---|---|---|
| 5,473,528 A * | 12/1995 | Hirata | ................... | H02M 7/493 363/71 |
| 5,926,004 A * | 7/1999 | Henze | .................... | B60L 53/11 320/109 |
| 5,959,368 A * | 9/1999 | Kubo | .................... | H02J 7/0025 307/29 |
| 10,742,107 B2 | 8/2020 | Liao | | |
| 2009/0271642 A1 * | 10/2009 | Cheng | .................... | G06F 1/263 713/300 |
| 2010/0164292 A1 * | 7/2010 | Freeman | ................. | G06F 1/263 307/80 |
| 2011/0157934 A1 * | 6/2011 | Clemo | .................... | H02J 1/102 363/71 |
| 2014/0203639 A1 * | 7/2014 | Rozman | ................. | H02J 3/007 307/28 |
| 2014/0217821 A1 * | 8/2014 | Rozman | .................... | H02J 1/14 307/29 |

(Continued)

FOREIGN PATENT DOCUMENTS

| | | | | |
|---|---|---|---|---|
| CN | 109639115 A | * | 4/2019 | ............. H02J 1/102 |
| DE | 102015104202 A1 | * | 9/2016 | |

(Continued)

*Primary Examiner* — Rexford N Barnie
*Assistant Examiner* — David A Shiao
(74) *Attorney, Agent, or Firm* — Karin L. Williams; Alan D. Kamrath; Mayer & Williams PC

(57) ABSTRACT

The power supply device with multiple outputs includes two output ports, a power converting module with two power output ends, and two switching modules connected among the two power output ends and the two output ports. The output power from the two power output ends can be independently allocated to either one or two of the two second output ports. When one of the output ports requests for a demand power, the power supply device is able to determine which one or both of the power output ends to output power to the output port, reaching a better power allocation efficiency.

11 Claims, 10 Drawing Sheets

(56) References Cited

U.S. PATENT DOCUMENTS

| | | | | |
|---|---|---|---|---|
| 2015/0076910 A1* | 3/2015 | Wang | ........................ | H02J 1/04 |
| | | | | 307/52 |
| 2015/0214742 A1* | 7/2015 | Yu | ............................. | H02J 4/00 |
| | | | | 307/86 |
| 2017/0104413 A1* | 4/2017 | Busch | ................... | G06F 1/3234 |
| 2017/0308153 A1* | 10/2017 | Chou | ...................... | G06F 1/263 |
| 2020/0336081 A1 | 10/2020 | Yan et al. | | |

FOREIGN PATENT DOCUMENTS

| | | |
|---|---|---|
| TW | M564745 U | 8/2018 |
| TW | 201904160 A | 1/2019 |

\* cited by examiner

POWER SUPPLY DEVICE WITH MULTIPLE OUTPUTS AND POWER ALLOCATION CONTROL METHOD THEREOF

BACKGROUND OF THE INVENTION

1. Field of the Invention

The present invention relates to a power supply device and a control method, and more particularly to a power supply device with multiple outputs and a power allocation control method thereof.

2. Description of the Related Art

In recent years, electronic devices for diverse purposes have been increasingly popular in daily lives. Most people carry more than one electronic device around, which often includes products that require large power input for charging or a power supply device, such as a tablet computer or laptop computer, for example, which usually requires input power above 45W. Therefore, a power supply device with multiple outputs, each output providing power at the same time and having at least one output that provides large output power is a main demand.

With reference to FIG. 10, a conventional power supply device with multiple outputs includes a first AC/DC converter A/D1, a second AC/DC converter A/D2, a first switch SW1, a second switch SW2, a third switch SW3, a first output port O/P1, and a second output port O/P2. The first AC/DC converter A/D1 and the second AC/DC converter A/D2 both receive an AC input power. The first AC/DC converter A/D1 has a first output end D1, the second AC/DC converter A/D2 has a second output end D2, the first switch SW1 is electrically connected between the first output end D1 and the first output port O/P1, the second switch SW2 is electrically connected between the second output end D2 and the second output port O/P2, and the third switch SW3 is electrically connected between the first output end D1 and the second output end D2.

When the first switch SW1 is turned on, the second switch SW2 and the third switch SW3 are turned off, the first AC/DC converter A/D1 outputs power through the first switch SW1 to the first output port O/P1. When the second switch SW2 is turned on, the first switch SW1 and the third switch SW3 are turned off, and the second AC/DC converter A/D2 outputs power through the first switch SW1 to the first output port O/P1. When the third switch SW3 is turned on, the first switch SW1 can be turned on and the second switch SW2 can be turned off, or the second switch SW2 can be turned on and the first switch SW1 can be turned off, so as to connect the first AC/DC converter A/D1 and the second AC/DC converter A/D2 to the first output port O/P1 or the second output port O/P2 in parallel. As a result, the first AC/DC converter A/D1 and the second AC/DC converter A/D2 connected in parallel may integratedly output a higher total output power to one of the output ports. In general, the first and second AC/DC converters A/D1, A/D2 are designed to have identical output power specification, so that the user does not need to intentionally choose between the two output ports.

An example of the conventional power supply device is provided hereby for better understanding.

When the first AC/DC converter A/D1 and the second AC/DC converter A/D2 both have a rated output power specification of 45W, the power supply device as a whole has a maximum output power of 90W. If the first output port O/P1 and the second output port O/P2 are each electrically connected to a device with required input power lower than 45W, the first switch SW1 and the second switch SW2 may be turned on, and the third switch SW3 may be turned off. Therefore, the first AC/DC converter A/D1 outputs power to the first output port O/P1, and the second AC/DC converter A/D2 outputs power to the second output port O/P2, providing the two devices with the required power.

However, when the device connected to the first output port O/P1 has a required power of 75W, the power supply device may control the first switch SW1 and the third switch SW3 to be turned on and the second switch SW2 to be turned off, such that both the output powers of the first AC/DC converter A/D1 and the second AC/DC converter A/D2 are connected to the first output port O/P1, and the output power for the first output port O/P1 is sufficient to provide that required by the device, but then the second output port O/P2 does not provide the power.

Namely, the first output port O/P1 and the second output port O/P2 can only output power under 45W simultaneously. Power above 45W can only be outputted through one of the output ports, while the other output port is unusable. For example, when a power-requiring device is connected to the first output port O/P1 and requires an output power of 20W, the power-requiring device will receive the output power from the first AC/DC converter. When the power-requiring device requires an output power of 50W, the power-requiring device will receive the integrated output power from the first AC/DC converter and the second AC/DC converter, and in this case, since the second power output end is connected to the first output port O/P1 through the third switch, the second output port O/P2 is not provided with any output port. However, the power supply device as a whole still has 40W of output power capability, which is idle and inefficient.

In other words, only power under half of the total output power can be provided to each of the output ports simultaneously. As long as a required output power of one of the output ports is slightly higher than half of the total output power, the other output port cannot output power even though the power supply device still has idle power output capability, resulting in an inconvenient user experience, restriction for power allocation design, and converting efficiency.

In conclusion, the conventional power supply device with multiple outputs needs to be improved.

SUMMARY OF THE INVENTION

Since the power allocation system of a conventional power supply device with multiple outputs has the disadvantages of poor power converting efficiency and user inconvenience, a goal of the present invention is to provide a power supply device with multiple outputs, including:
  a first output port;
  a second output port;
  a power converting module having
    a first power output end outputting a first output power; and
    a second power output end outputting a second output power;
  a first switching module electrically connected to the first power output end, the first output port, and the second output port to selectively connect the first power output end to one of the first output port and the second output port, or connect or disconnect the first power output end to or from both the first output port and the second output port; and a second switching module electrically connected to the second power output end, the first output port, and the second output port to selectively connect the second power output end to one of the first output port and the second output port, or connect or disconnect the second power output end to and from both the first output port and the second output port.

In the present invention, the first power output end is connected to the first output port and the second output port through the first switching module, and the second power output end is connected to the first output port and the second output port through the second switching module. With the controlling of the first switching module and the second switching module, the first power output end can output power to the first output port or the second output port, while the second power output end can also output power to the first output port or the second output port. Therefore, the power converting module can output power through either one of the power output ends to either one of the power output ports, or output power through both the power output ends to one of the power output ports if a higher demand power is required at the output port.

Since the first power output end and the second power output end can be connected to either one of the output ports to supply power, the two output ports are identical to the user even if the two power output ends are specified to have different output powers. The user does not need to choose from the two output ports when connecting an electronic device to the power supply device.

The present invention yet provides a power allocation control method, including the following steps:

when a first demand power of a first output port is detected, determining whether the first demand power is higher than a first rated-power value of a first power output end;

when the first demand power is higher than the first rated-power value, connecting the first power output end and a second power output end to the first output port rather than a second output port;

when the first demand power is not higher than the first rated-power value, further determining whether the first demand power is higher than a second rated-power value of the second power output end;

when the first demand power is not higher than the first rated-power value but higher than the second rated-power value, connecting the first power output end to the first output port rather than the second output port, and disconnecting the second power output end from the first output port and the second output port;

when the first demand power is not higher than the second rated-power value, disconnecting the first power output end from the first output port and the second output port, and connecting the second power output end to the first output port rather than the second output port.

Since the first output power from the first power output end and the second output power from the second power output end can be arbitrary allocated to either one or two of the first and second output ports, when one of the output ports requests for a demand power, the power supply device is able to determine which one or both of the power output ends to output power to the output port, reaching a better power allocation efficiency.

Furthermore, since the first power output end and the second power output end can have different rated-power values, the power converting module can be optimized for two different output powers, and has better power utilization efficiency in a wider output power range. For example, the rated output power of the first power output end is 60W, the rated output power of the second power output end is 30W, and therefore the total maximum output power of the power supply device is 90W. When one of the output ports has a demand power of 20W, the second output power from the second power output end may be provided to the demanding output port; when one of the output ports has a demand power of 50W, the first output power from the first power output end may be provided to the demanding output port; when one of the output ports has a demand power of 75W, an integrated output power of the first and second output powers from the first and second power output ends may be provided to the demanding output port.

In conclusion, the power supply device of the present invention may be optimized according to different output powers. Therefore, the power supply device can operate under good power converting efficiency while providing different output powers. The user can connect a device that requires any level of input power to either one of the output ports and receives an output power with high converting efficiency. The present invention provides high converting efficiency at different output powers, while at the same time providing better convenience for users, overcoming the disadvantages of the conventional power supply device with multiple outputs.

DETAILED DESCRIPTION OF THE INVENTION

Figure 1:
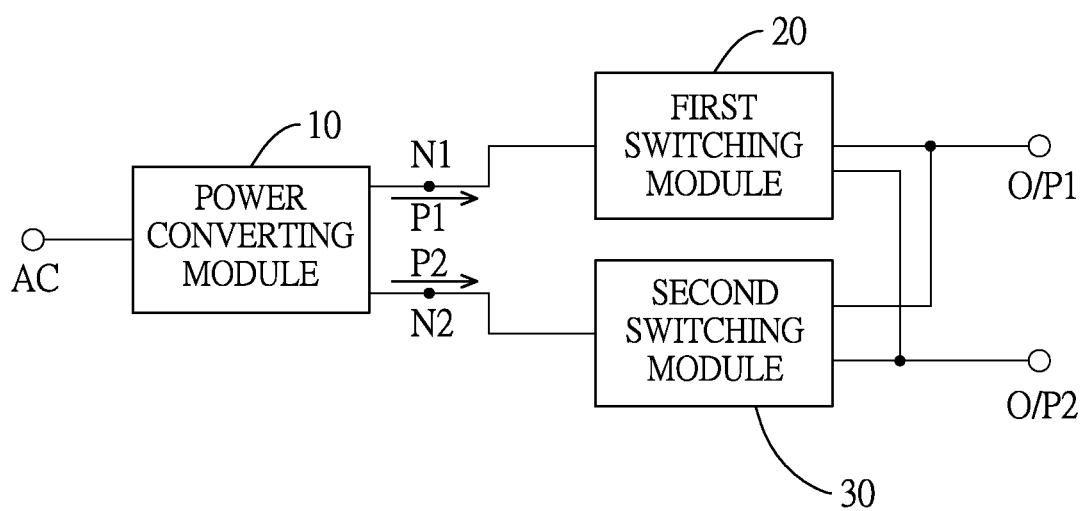
FIG. 1 is a block diagram of the power supply device of the present invention.

With reference to FIG. 1, the power supply device with multiple outputs of the present invention includes a first output port O/P1, a second output port O/P2, a power converting module 10, a first switching module 20, and a second switching module 30. The power converting module 10, providing a first output power with a first rated-power value and providing a second output power with a second rated-power value, has a first power output end N1 and a second power output end N2. The power converting module 10 receives an AC input power, and converts the AC power to a first output power P1 and a second output power P2, wherein the first output power P1 is outputted from the first power output end N1, and the second output power P2 is outputted from the second power output end N2. Preferably, the rated values of the first output power P1 and the second output power P2 are different.

An input end of the first switching module 20 is electrically connected to the first power output end N1, and two output ends of the first switching module 20 are electrically connected to the first output port O/P1 and the second output port O/P2, such that the first switching module 20 is able to selectively connect the first power output end N1 to the first output port O/P1 or the second output port O/P2. Similarly, an input end of the second switching module 30 is electrically connected to the second power output end N2, and two output ends of the second switching module 30 are electrically connected to the first output port O/P1 and the second output port O/P2, such that the second switching module 30 is able to selectively connect the second power output end N2 to the first output port O/P1 or the second output port O/P2.

Figure 2:
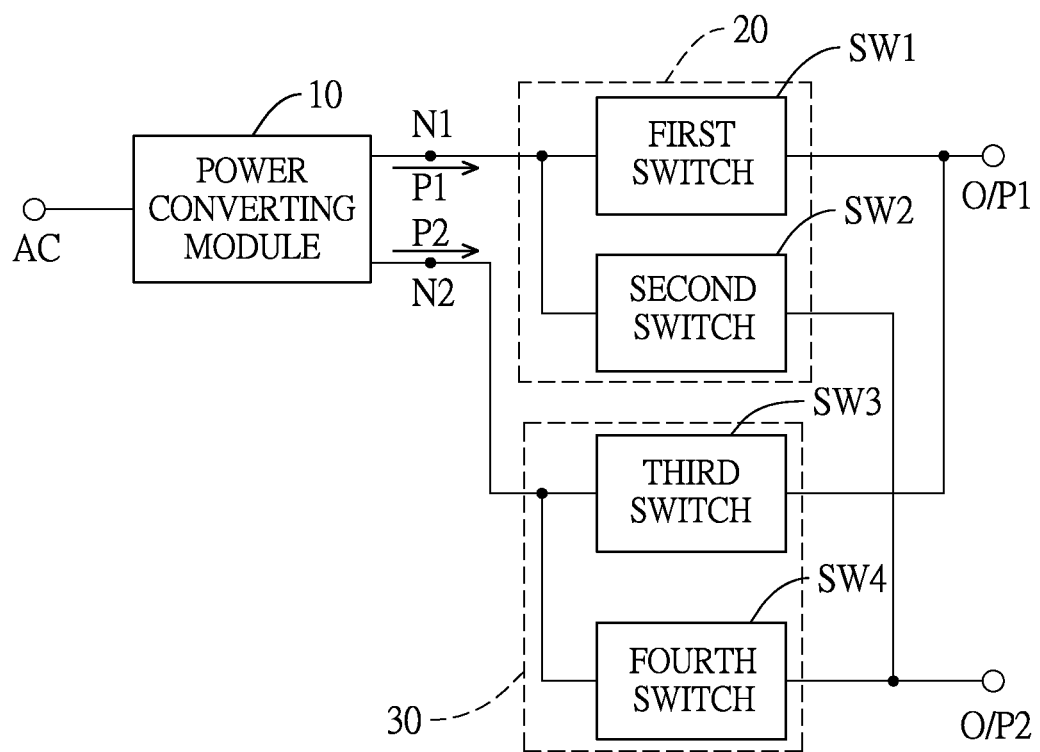
FIG. 2 is a block diagram of an embodiment of the power supply device of the present invention.

With reference to FIG. 2, more specifically, the first switching module 20 includes a first switch SW1 and a second switch SW2, and the second switching module 30 includes a third switch SW3 and a fourth switch SW4. The first switch SW1 is electrically connected between the first power output end N1 and the first output port O/P1; the second switch SW2 is electrically connected between the first power output end N1 and the second output port O/P2; the third switch SW3 is electrically connected between the second power output end N2 and the first output port O/P1; the fourth switch SW4 is electrically connected between the second power output end N2 and the second output port O/P2. Each of the first switch SW1 to the fourth switch SW4 can be controlled to be conductive or opened, so that the first power output end N1 and the second power output end N2 are selectively connected to the first output port O/P1 or the second output port O/P2.

With reference to Table 1 (shown below), the different states of the first output power P1 and the second output power P2 allocated to the first output port O/P1 or the second output port O/P2 are controlled by controlling the first switch to the fourth switch SW1-SW4. In Table 1, symbol "O" means the corresponding switch being turned on, and symbol "X" means the corresponding switch being turned off. The symbol "P1" means the corresponding output port outputting the first output power P1, the symbol "P2" means the corresponding output port outputting the second output power P2, and the symbol "P1+P2" means the corresponding output port outputting the integration of the first output power P1 and the second output power P2.

| SW1 | SW2 | SW3 | SW4 | O/P1 | O/P2 |
|---|---|---|---|---|---|
| X | X | X | X | NO | NO |
| O | X | X | X | P1 | NO |
| X | O | X | X | NO | P1 |
| X | X | O | X | P2 | NO |
| O | O | X | X | P1 | P1 |
| X | X | O | O | P2 | P2 |
| O | X | X | O | P1 | P2 |
| X | O | O | X | P2 | P1 |
| O | X | O | X | P1 + P2 | NO |
| X | O | X | O | NO | P1 + P2 |

Figure 3:
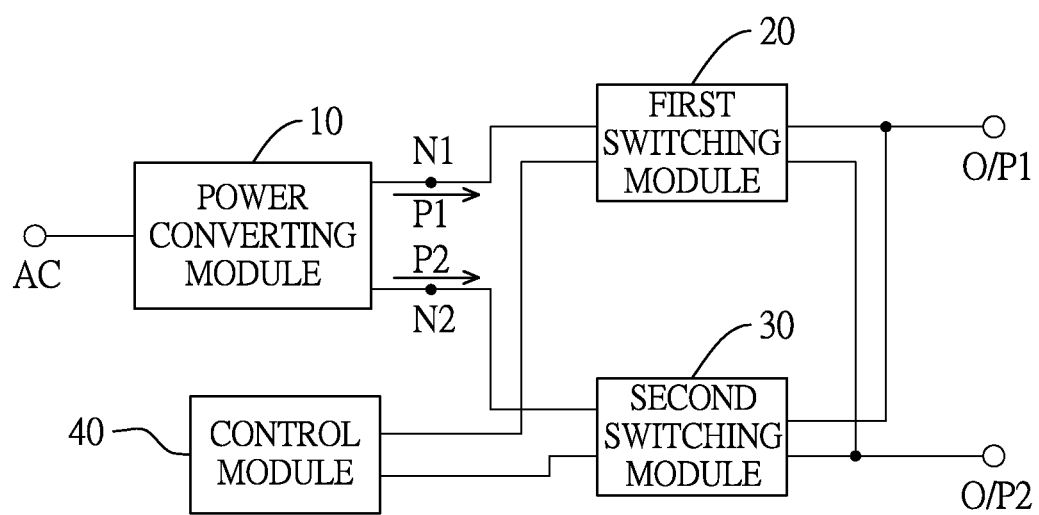
FIG. 3 is a block diagram of another embodiment of the power supply device of the present invention.

With reference to FIG. 3, preferably, the power supply device module includes a control module 40, electrically connected to the first output port O/P1, the second output port O/P2, the first switching module 20 and the second switching module 30. The control module 40 detects a first demand power of the first output port O/P1 and a second demand power of the second output port O/P2 to control the first switching module 20 and the second switching module 30 accordingly. The control module 40 controls the first switching module 20 to selectively connect the first power output end N1 to the first output port O/P1 or the second output port O/P2, or to disconnect from both of the output ports; the control module 40 also controls the second switching module 30 to selectively connect the first power output end N1 to the first output port O/P1 or the second output port O/P2, or to disconnect from both of the output ports. Preferably, the control module 40 detects the first demand power by communicating with a first power-requiring device connected to the first output port O/P1 according to the Power Delivery Protocol (PD protocol), and also detects the second demand power by communicating with a second power-requiring device connected to the second output port O/P2 according to the PD protocol. The control module 40 controls the first switch SW1 to the fourth switch SW4 to achieve the controlling of the first switching module 20 and the second switching module 30. In an embodiment of the present invention, the control module 40 may be a controller microchip or a digital processor.

According to Table 1, the first output power P1 and the second output power P2 may be selectively allocated to the first output port O/P1 and the second output port O/P2 in at least the following different ways: the first output power P1 outputted to the first output port O/P1, the second output power P2 outputted to the second output port O/P2; the first output power P1 outputted to the second output port O/P2, the second output power P2 outputted to the first output port O/P1; both the first output power P1 and the second output power P2 outputted to the first output port O/P1, or both the first output power P1 and the second output power P2 outputted to the second output port O/P2.

Figure 4:
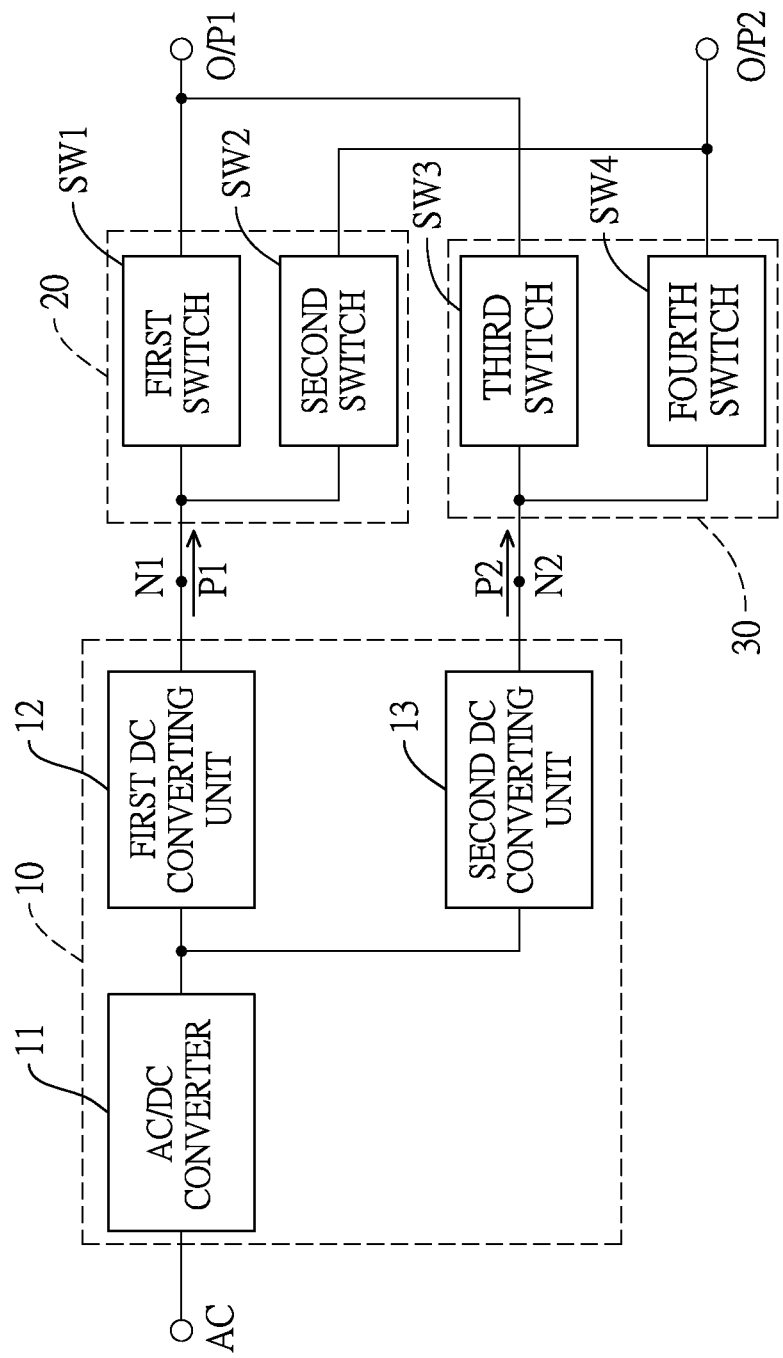
FIG. 4 is a block diagram of another embodiment of the power supply device of the present invention.

With reference to FIG. 4, in an embodiment of the present invention, the power converting module 10 includes an AC/DC (alternative current to direct current) converter, a first DC (direct current) converting unit having the first rated-power value, and a second DC converting unit 13 having the second rated-power value. The AC/DC converter 11 receives an AC input power, and converts the AC input power to a DC power. The first DC converting unit 12 is electrically connected to the AC/DC converter 11, receives the DC power, converts the DC power to the first output power P1, and outputs the first output power P1 to the first power output end N1. The second DC converting unit 13 is electrically connected to the AC/DC converter 11, receives the DC power, converts the DC power to the first output power P1, and outputs the first output power P1 to the first power output end N1.

Figure 5:
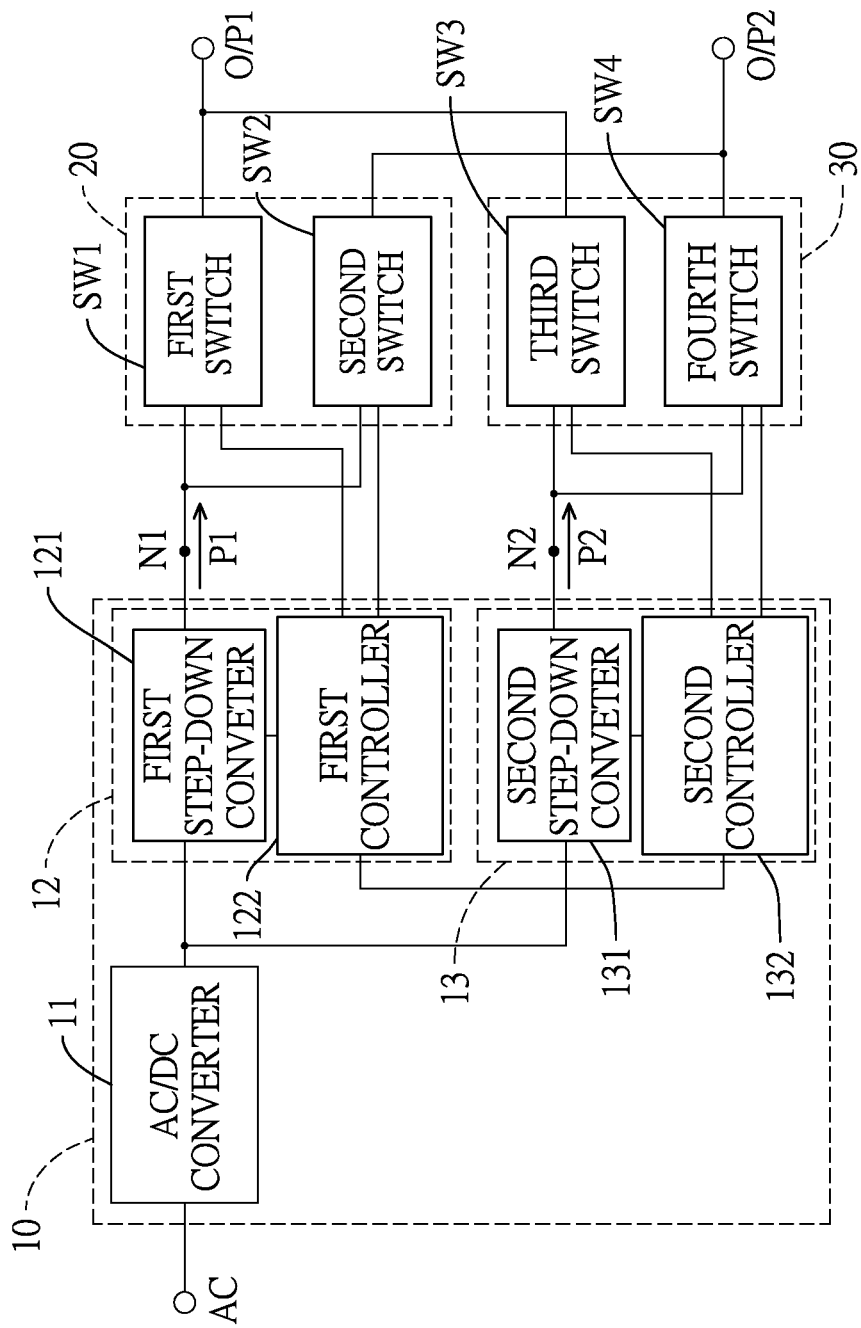
FIG. 5 is another block diagram of another embodiment of the power supply device of the present invention.

With reference to FIG. 5, preferably, the AC/DC converter 11 includes a Flyback converter, the first DC converting unit 12 includes a first step-down converter 121 and a first controller 122, and the second DC converting unit 13 includes a first step-down converter 131 and a second controller 132. The first and second step-down converters 121, 131 may be Buck converters.

The AC/DC converter 11 converts the AC input power into a DC power, and the first DC converting unit 12 and the second DC converting unit 13 convert the DC power to the first output power P1 and the second output power P2 to be allocated to the first output port O/P1 and the second output port O/P2. In the present embodiment, there is no need for an AC/DC converter 11 for each output port, reducing the required space for disposing isolating transformer. With the optimized design for the first and second DC converting units 12, 13, the power supply device still provides multiple efficiency optimized output powers. In the present embodiment, the first DC converting unit 12 is optimized according to the first rated-power value of the first power output end N1, and the second DC converting unit 13 is optimized according to the second rated-power value of the second power output end N2.

In the present invention, the control module 40 includes the first controller 122 of the first DC converting unit 12 and the second controller 132 of the second DC converting unit 13. The first controller 122 is electrically connected to the first output port O/P1 to detect the first demand power, and is electrically connected to the first switching module 20 to control the first switching module 20. Similarly, the second controller 132 is electrically connected to the second output port O/P2 to detect the second demand power, and is electrically connected to the second switching module 30 to control the second switching module 30; the first controller 122 and the second controller 132 are electrically connected to transmit the first demand power and the second demand power to each other. The first controller 122 controls the first switching module 20 according to the first demand power and the second demand power, and the second controller 132 controls the second switching module 30 according to the first demand power and the second demand power. In short, the first controller 122 and the second controller 132 learn the first and second demand powers by communicating with each other, and therefore can determine the controlling of the first and second switching modules 20, 30 in cooperation.

In the present embodiment, the control module 40 comprises the controllers of the DC converting units, such that the first and second controllers 122, 132 communicate directly to cooperatively receive the first and second demand powers of the first and second output ports O/P2. An additional processor is therefore omitted for the controlling of the first switching module 20 and the second switching module 30.

Preferably, the first rated-power value of the first power output end N1 and the second rated-power value of the second power output end N2 are different. That is, the first DC converting unit 12 and the second DC converting unit 13 are optimized according to two different output powers, such that the power supply device of the present invention has a wider range of high efficiency output power. That is, when a power-requiring device is connected to one of the output ports, the output power closer to the demand power of the power-requiring device can be switched to the output port by the first and second switching modules 20, 30. An application example of the present invention will be provided under the presumption that the first rated-power value is higher than the second rated-power value, and that the first output port O/P1 is connected to a first power-requiring device. It should be noted that when the second output port O/P2 is connected to a second power-requiring device in the first place, the output power is provided to the second output port O/P2 under the determination of providing the output power that has the higher and closer rated-power value to the demand power. Since the logic of the determination step is similar, it is hereby omitted.

In a preferred embodiment of the present invention, when the control module 40 detects the first demand power of the first output port O/P1, the control module 40 determines if the first demand power is higher than the first rated-power value; if the first demand power is higher, the control module 40 controls the first switching module 20 to connect the first power output end N1 to the first output port O/P1 rather than the second output port O/P2, and controls the second switching module 30 to connect the first power output end N1 to the first output port O/P1 rather than the second output port O/P2. If the first demand power is not higher, the control module 40 further determines if the first demand power is higher than the second rated-power value; if the first demand power is lower than the first rated-power value and higher than the second rated-power value, the control module 40 controls the first switching module 20 to connect the first power output end N1 to the first output port O/P1 rather than the second output port O/P2, and controls the second switching module 30 to disconnect the second power output end N2 from both the first output port O/P1 and the second output port O/P2; if the first demand power is lower than the second rated-power value, the control module 40 controls the first switching module 20 to disconnect the first power output end N1 from both the first output port O/P1 and the second output port O/P2, and controls the second switching module 30 to connect the second power output end N2 to the first output port O/P1 rather than the second output port O/P2.

Figure 6:
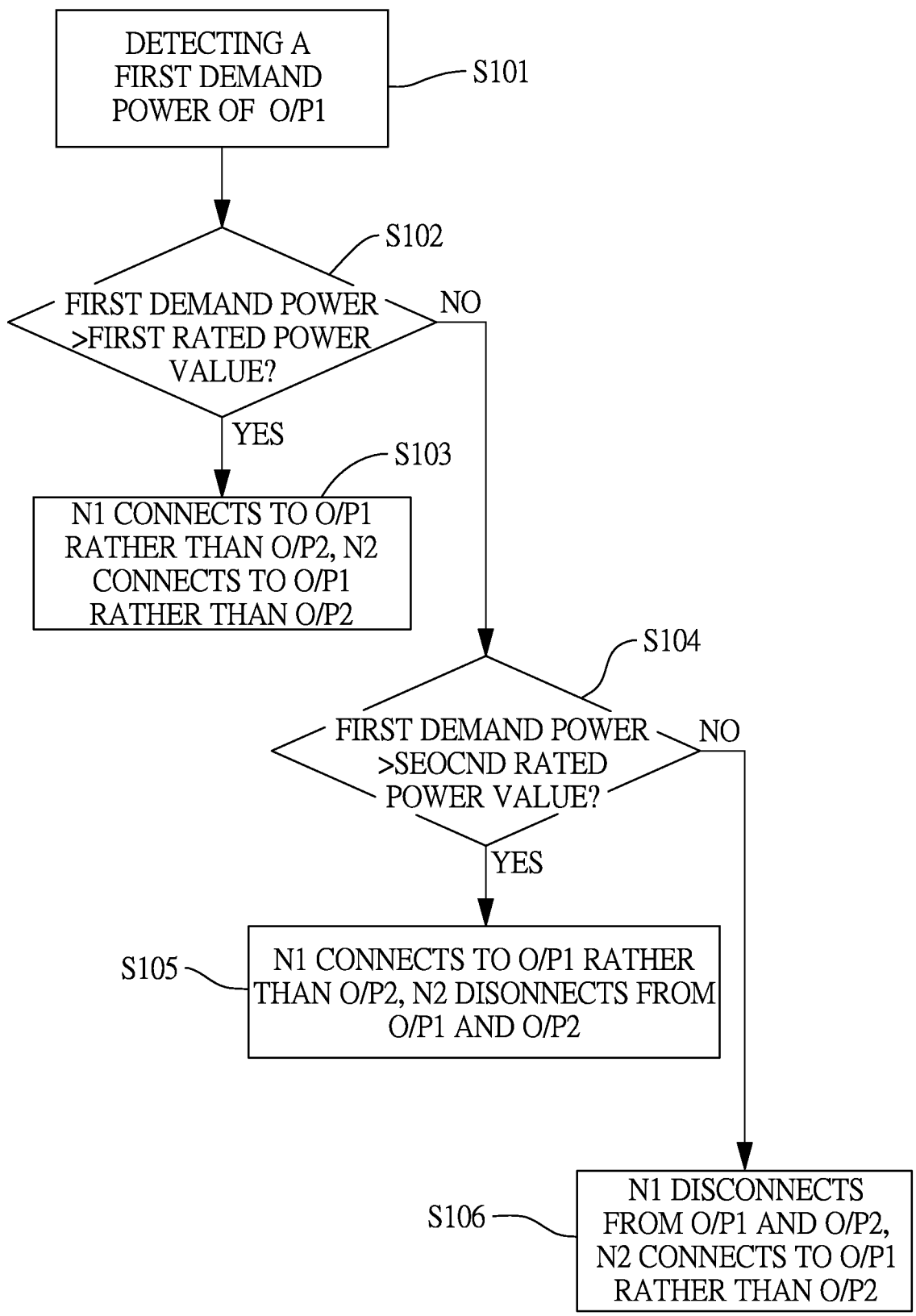
FIG. 6 is a flow chart of the power allocation control method of the present invention.

With reference to FIG. 6, the power allocation control method of the present invention includes the following steps:

when a first demand power of a first output port is detected (S101), determining whether the first demand power is higher than a first rated-power value of a first power output end (S102);
    when the first demand power is higher than the first rated-power value, connecting the first power output end and a second power output end to the first output port rather than a second output port (S103);
when the first demand power is not higher than the first rated-power value, further determining whether the first demand power is higher than a second rated-power value of the second power output end (S104);
    when the first demand power is not higher than the first rated-power value but higher than the second rated-power value, connecting the first power output end to the first output port rather than the second output port, and disconnecting the second power output end from the first output port and the second output port (S105);
    when the first demand power is not higher than the second rated-power value, disconnecting the first power output end from the first output port and the second output port, and connecting the second power output end to the first output port rather than the second output port (S106).

In the following application examples, the first rated-power value of the first power output end N1 is 60W, and the second rated-power value of the second power output end N2 is 30W.

In a first application example, the first demand power of the first output port O/P1 is lower than the second rated-power value, for example, 30W. There are three different power allocation ways to fulfill the required output: connecting the first power output end N1 to the first output port O/P1, connecting the second power output end N2 to the first output port O/P1, or connecting both the first and the second power output ends N2 to the first output port O/P1. According to the common knowledge of the power converting technology, the second output power P2 provided by the second DC converting unit 13 can be converted with the highest efficiency. Therefore, the control module 40 controls the first switching module 20 to disconnect the first power output end N1 from the two output ports, and controls the second switching module 30 to connect the second power output end N2 to the first output port O/P1.

In a second application example, the first demand power of the first output port O/P1 is lower than the first rated-power value but higher than the second rated-power value. For example, 50W. There are two different power allocation ways to fulfill the required output: connecting the first power output end N1 to the first output port O/P1, or connecting both the first and the second power output ends N2 to the first output port O/P1. Since the first output power P1 is enough to provide the first demand power of 50W, providing both the first and second output powers P2 leads to redundant efficiency. Therefore, providing the first output power P1 to the first output port O/P1 is the better choice.

Therefore, the control module 40 controls the first switching module 20 to connect the first power output end N1 to the first output port O/P1, and controls the second switching module 30 to disconnect the second power output end N2 from both of the two output ports.

In the above mentioned application example, if the second output port O/P2 is further connected to another power requiring device, the control module 40 may further control the second switching module 30 or the first switching module 20 to connect the idle power output end to the second output port O/P2, such that the other output power can be provided to the second output port O/P2.

With the first switching module 20 and the second switching module 30 of the present invention, the output power of the first power output end N1 and the second power output end N2 can be allocated to either of the out ports flexibly according to the demand power at the output ports. Even when the demand power of an output port is higher than half of the total specified output power of the multiple output power supply devices, the power output end with higher specified output power than the demand power is sufficient to provide, while the other power output end with lower output power is still idle and able to provide power for the other output port when needed.

In a third application example, when the first demand power is higher than the first rated-power value, for example, 75W, the control module 40 controls the first and second switching modules 20, 30 to connect both the first and second power output ends N1, N2 to the first output port O/P1, such that the integrated power of the first and the second power output ends N1, N2 is provided to the first output port O/P1.

Furtherly, when the first output port O/P1 has a first demand power in the first place, and the second output port O/P2 has a second demand power afterward, the control module 40 determines whether the first demand power is higher than the second rated-power value. When the first demand power is higher, the control module 40 controls the first switching module 20 to connect the first power output end N1 to the first output port O/P1, and controls the second switching module 30 to connect the second power output end N2 to the second output port O/P2. When the first demand power is not higher, the control module 40 controls the first switching module 20 to connect the first power output end N1 to the second output port O/P2, and controls the second switching module 30 to connect the second power output end N2 to the first output port O/P1.

Figure 7:
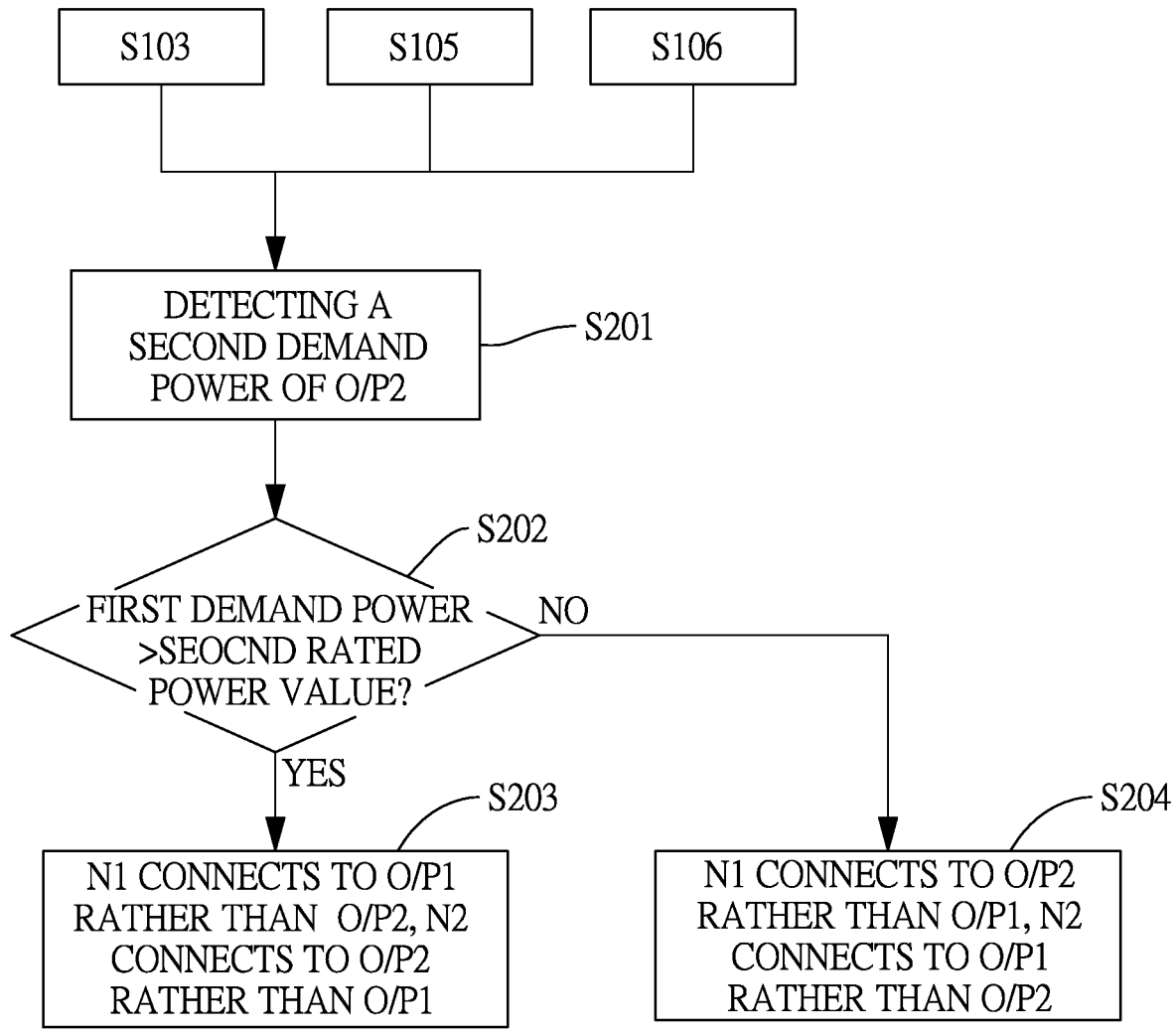
FIG. 7 is a flow chart of an embodiment of the power allocation control method of the present invention.

With reference to FIG. 7, the power allocation control method of the present invention further includes the following steps:

when a second demand power of the second output port is further detected (S201), determining whether the first demand power is higher than the second rated-power value (S202);

when the first demand power is higher than the second rated-power value, connecting the first power output end to the first output port rather than the second output port, and connecting the second power output end to the second output port rather than the first output port (S203);

when the first demand power is not higher than the second rated-power value, connecting the first power output end to the second output port rather than the first output port, and connecting the second power output end to the first output port rather than the second output port (S204).

In the present invention, when the first output port O/P1 is connected to a power-requiring device firstly and has a first demand power, and then the second output port O/P2 is connected to another power-requiring device and has a second demand power, the control module 40 simply compares the first and second demand powers to the first and second rated-power values. The control module 40 controls the second switching module 30 to connect the second power output end N2 to the first output port O/P1, preventing the situation of providing the first output power P1 with higher rated-power value to the first output port O/P1 that requires lower output power. In other conditions, the first output power P1 is provided to the first output port O/P1, and the second output power P2 is provided to the second output port O/P2.

Figure 8:
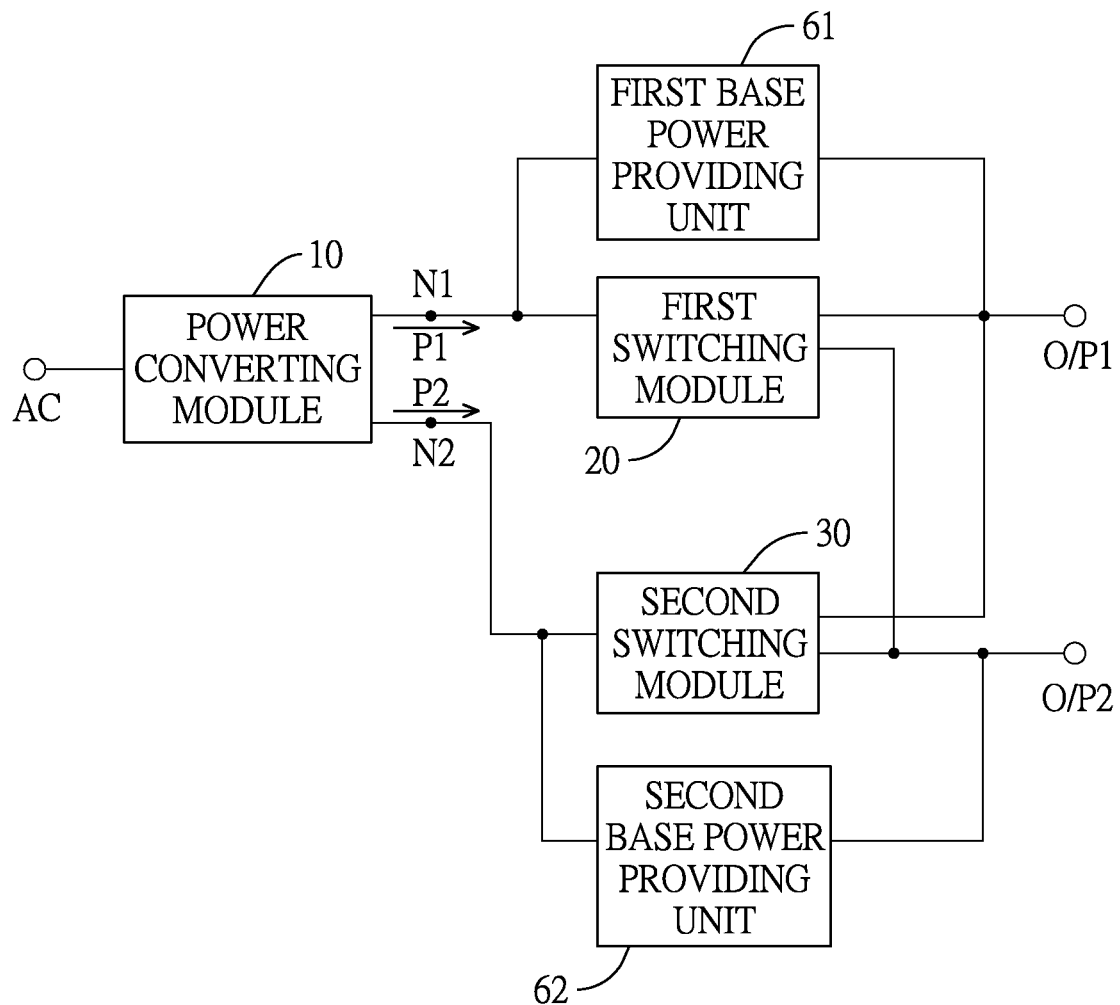
FIG. 8 is a block diagram of the power supply device of the present invention.

With reference to FIG. 8, in another embodiment of the present invention, the power supply device includes a first base power providing unit 61 and a second base power providing unit 62. The first base power providing unit 61 is electrically connected between the first power output end N1 and the first output port O/P1. When the first switching module 20 connects the first power output end N1 to the second output port O/P2 rather than the first output port O/P1, and the second switching module 30 connects the second power output end N2 to the second output port O/P2 rather than the first output port O/P1, the first base power providing unit 61 receives the first output power P1, converts the first output power P1 to a first base power, and outputs the first base power to the first output port O/P1. Similarly, the second base power providing unit 62 is electrically connected between the second power output end N2 and the second output port O/P2. When the first switching module 20 connects the first power output end N1 to the first output port O/P1 rather than the second output port O/P2, and the second switching module 30 connects the second power output end N2 to the first output port O/P1 rather than the second output port O/P2, the second base power providing unit 62 receives the second output power P2, converts the second output power P2 to a second base power, and outputs the second base power to the second output port O/P2.

In the present embodiment, when one of the output ports has the demand power higher than the first rated-power value, and the first and second switching modules 20, 30 connect the first and second power output ends N2 to the output port to provide sufficient output power, the first and second base power providing units 61, 62 convert the first or second output power P2 to a base output power with a low rated-power value, such as a base output power of 5V/1 A, and provides the base output power to the other output port. In short, in the present embodiment, when one of the output ports requires a high demand power that requires the output of both the first output power P1 and the second output port O/P2, the other output port may still receive a base output power when connected to another power-requiring device without re-switching or re-connecting of the first and second switching modules 20, 30, and will not be totally unusable.

Figure 9:
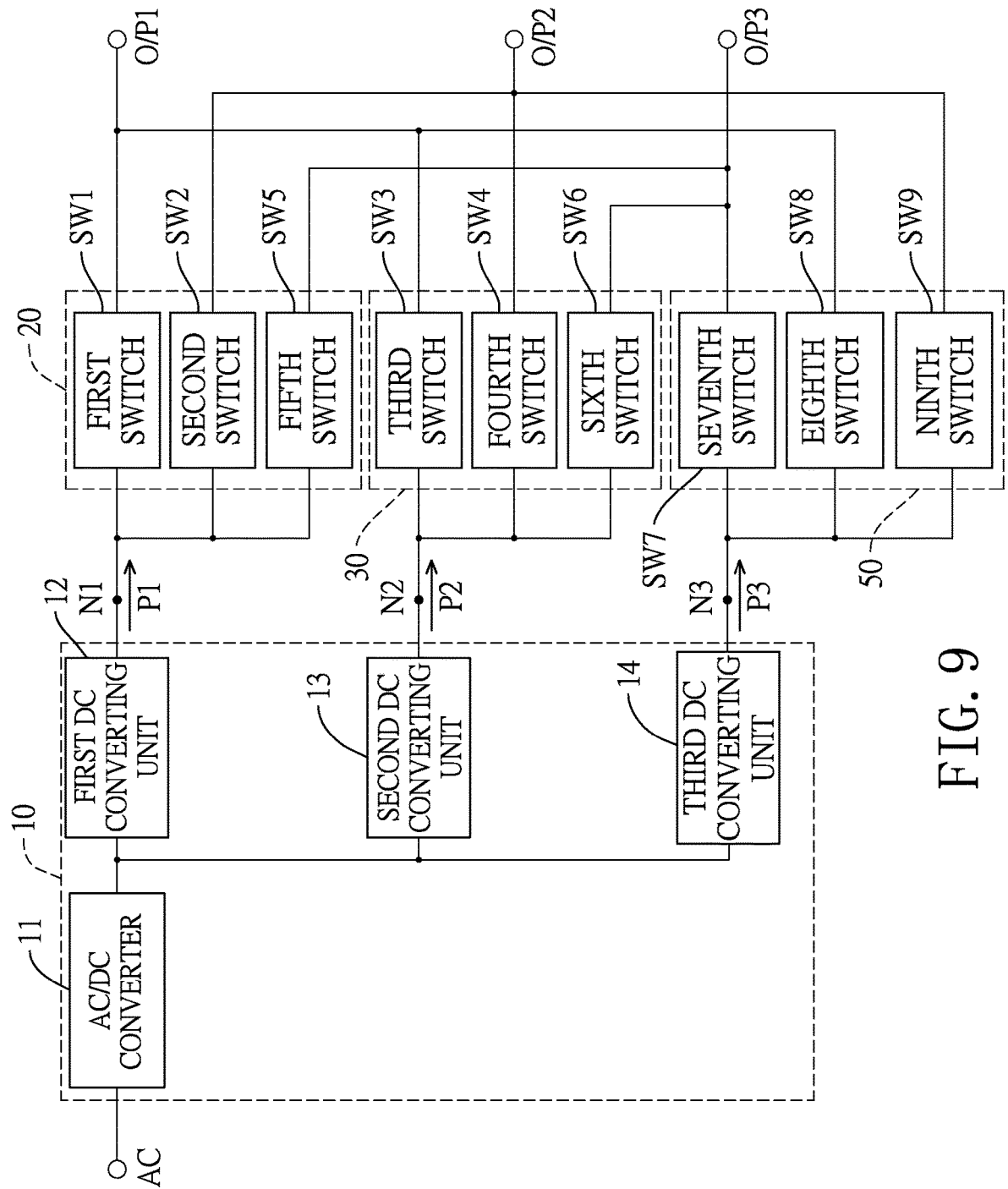
FIG. 9 is a block diagram of the power supply device of the present invention.
Figure 10:
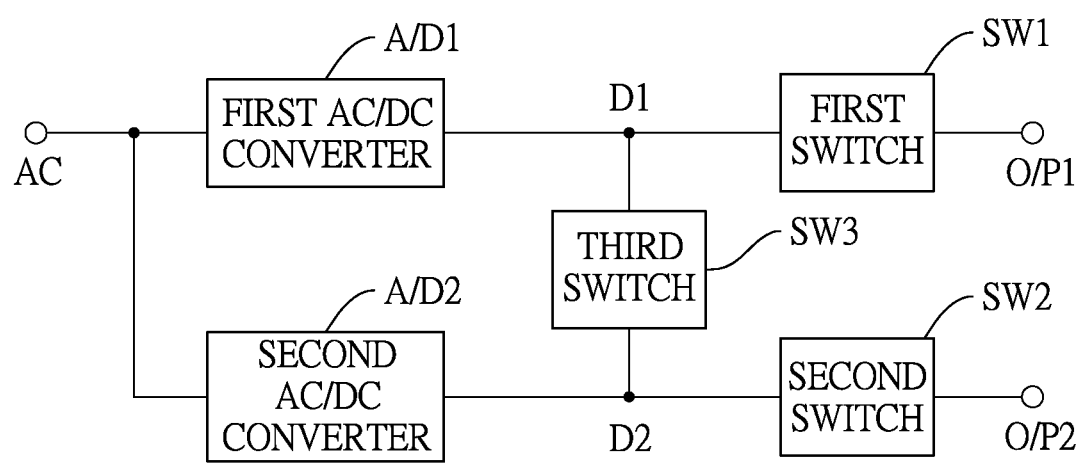
FIG. 10 is a block diagram of a conventional power supply device with multiple outputs.

With reference to FIG. 9, in an embodiment of the present invention, the power supply device further includes a third output port O/P3 and a third switching module 50, and the power converting module 10 further comprises a third power output end N3. The third switching module 50 is electrically connected to the third power output end N3 and the first output port O/P1, the second output port O/P2 and the third output port O/P3, and selectively connects the third power output end N3 to one or two of the first output port O/P1, the second output port O/P2 and the third output port O/P3, or disconnects from all of the first output port O/P1, the second output port O/P2 and the third output port O/P3. The first switching module 20 is also electrically connected between the first power output end N1 and the third output port O/P3, and selectively connects the first power output end N1 to the third output port O/P3. The second switching module 30 is also electrically connected between the second power output end N2 and the third output port O/P3, and selectively connects the second power output end N2 to the third output port O/P3.

In the present embodiment, the power supply device has three output ports, and the power converting module 10 also further includes a third power output end N3. Preferably, the first, second and third switching modules 50 each include three switches, each of the switches is electrically connected between the first, second and third power output ends N1, N2, N3 and the first, second and third output ports O/P1, O/P2, O/P3, so that the connection between each power output end and each output port can be controlled separately.

Furthermore, the power converting module 10 includes the AC/DC converter 11 and DC converting units corresponding to each of the power output ends N1, N2, N3. In the present embodiment, the power converting module 10 further includes a third DC converting unit 14, which also includes a step-down converter and a controller.

As a reasonable result of the topology of the power supply device in the present invention, the number of the power output ends and DC converting units of the power converting module 10 can be expanded according to the requirement of the power supply device. Since the efficiency of the different specified output powers can be optimized through the optimization of each of the step-down converters, without the need of disposing extra AC/DC converters 11, the present invention improves power utilization efficiency in multiple different using situations, and reduces the space and size requirement of the power supply device at the same time.

Even though numerous characteristics and advantages of the present invention have been set forth in the foregoing description, together with details structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A power supply device with multiple outputs, comprising:
    a first output port;
    a second output port;
    a power converting module providing a first output power with a first rated-power value, providing a second output power with a second rated-power value, and having
        a first power output end outputting the first output power; and
        a second power output end outputting the second output power; the first rated-power value being higher than the second rated-power value;
    a first switching module electrically connected to the first power output end, the first output port, and the second output port; wherein the first switching module connects the first power output end to either one of the first output port and the second output port, connects the first power output end to both the first output port and the second output port, or disconnects the first power output end from both the first output port and the second output port;
    a second switching module electrically connected to the second power output end, the first output port, and the second output port; wherein the second switching module connects the second power output end to either one of the first output port and the second output port, connects the second power output end to both the first output port and the second output port, or disconnects the second power output end from both the first output port and the second output port; and
    a control module electrically connected to the first output port, the second output port, the first switching module, and the second switching module; wherein the control module detects a first demand power of the first output port and a second demand power of the second output port to control the first switching module and the second switching module accordingly:
        when the control module detects the first demand power of the first output port, the control module determines whether the first demand power is higher than the first rated-power value;
        when the first demand power is higher than the first rated-power value, the control module controls the first switching module to connect the first power output end to the first output port rather than the second output port, and controls the second switching module to connect the second power output end to the first output port rather than the second output port;
        when the first demand power is not higher than the first rated-power value, the control module further determines whether the first demand power is higher than the second rated-power value;
        when the first demand power is lower than the first rated-power value and higher than the second rated-power value, the control module controls the first switching module to connect the first power output end to the first output port rather than the second output port, and controls the second switching module to disconnect the second power output end from the first output port and the second output port; and
        when the first demand power is lower than the second rated-power value, the control module controls the first switching module to disconnect the first power output end from the first output port and the second output port, and controls the second switching module to connect the second power output end to the first output port rather than the second output port.

2. The power supply device with multiple outputs as claimed in claim 1, wherein the power converting module comprises:
    an AC/DC converter, receiving an AC input power, and converting the AC input power to a DC power;
    a first DC converting unit, electrically connected to the AC/DC converter, receiving the DC power, having the first rated-power value, converting the DC power to the first output power, and outputting the first output power to the first power output end; and a second DC converting unit, electrically connected to the AC/DC converter, receiving the DC power, having the second rated-power value, converting the DC power to the second output power, and outputting the second output power to the second power output end.

3. The power supply device with multiple outputs as claimed in claim 2, wherein
the first DC converting unit comprises a first step-down converter and a first controller, the second DC converting unit comprises a second step-down converter and a second controller, and the control module includes the first controller and the second controller; wherein
the first controller is electrically connected to the first output port to detect the first demand power, and is electrically connected to the first switching module to control the first switching module;
the second controller is electrically connected to the second output port to detect the second demand power, and is electrically connected to the second switching module to control the second switching module;
the first controller and the second controller are electrically connected to each other to transmit the first demand power and the second demand power to each other;
the first controller controls the first switching module according to the first demand power and the second demand power; and
the second controller controls the second switching module according to the first demand power and the second demand power.

4. The power supply device with multiple outputs as claimed in claim 1, wherein
the first switching module comprises:
a first switch, electrically connected between the first power output end and the first output port; and
a second switch, electrically connected between the first power output end and the second output port; and
the second switching module comprises:
a third switch, electrically connected between the second power output end and the first output port; and
a fourth switch, electrically connected between the second power output end and the second output port.

5. The power supply device with multiple outputs as claimed in claim 1, further comprising:
a first base power providing unit, electrically connected between the first power output end and the first output port; wherein when the first switching module connects the first power output end to the second output port rather than the first output port, and the second switching module connects the second power output end to the second output port rather than the first output port, the first base power providing unit receives the first output power, converts the first output power to a first base power, and outputs the first base power to the first output port; and
a second base power providing unit, electrically connected between the second power output end and the second output port; wherein when the first switching module connects the first power output end to the first output port rather than the second output port, and the second switching module connects the second power output end to the first output port rather than the second output port, the second base power providing unit receives the second output power, converts the second output power to a second base power, and outputs the second base power to the second output port.

6. The power supply device with multiple outputs as claimed in claim 1, further comprising:
a third output port; and
a third switching module; wherein
the power converting module further comprises a third power output end, wherein
the third switching module is electrically connected to the third power output end, the first output port, the second output port, and the third output port to selectively connect the third power output end to one or two of the first output port, the second output port, and the third output port, or disconnect the third power output end from the first output port, the second output port, and the third output port;
the first switching module is electrically connected to the third output port to selectively connect or disconnect the first power output end to or from the third output port; and
the second switching module is electrically connected to the third output port to selectively connect or disconnect the second power output end to or from the third output port.

7. A power supply device with multiple outputs, comprising:
a first output port;
a second output port;
a power converting module providing a first output power with a first rated-power value, providing a second output power with a second rated-power value, and having
a first power output end outputting the first output power; and
a second power output end outputting the second output power; the first rated-power value being higher than the second rated-power value;
a first switching module electrically connected to the first power output end, the first output port, and the second output port; wherein the first switching module connects the first power output end to either one of the first output port and the second output port, connects the first power output end to both the first output port and the second output port, or disconnects the first power output end from both the first output port and the second output port;
a second switching module electrically connected to the second power output end, the first output port, and the second output port; wherein the second switching module connects the second power output end to either one of the first output port and the second output port, connects the second power output end to both the first output port and the second output port, or disconnects the second power output end from both the first output port and the second output port; and
a control module electrically connected to the first output port, the second output port, the first switching module, and the second switching module; wherein the control module detects a first demand power of the first output port and a second demand power of the second output port to control the first switching module and the second switching module accordingly:
when the control module detects the first demand power of the first output port and detects the second demand power of the second output port, the control module determines whether the first demand power is higher than the second rated-power value;
when the first demand power is higher than the second rated-power value, the control module controls the first switching module to connect the first power output end to the first output port rather than the second output port, and controls the second switching module to connect the second power output end to the second output port rather than the first output port; and when the first demand power is not higher than the second rated-power value, the control module controls the first switching module to connect the first power output end to the second output port rather than the first output port, and controls the second switching module to connect the second power output end to the first output port rather than the second output port.

8. The power supply device with multiple outputs as claimed in claim 7, wherein the power converting module comprises:
an AC/DC converter, receiving an AC input power, and converting the AC input power to a DC power;
a first DC converting unit, electrically connected to the AC/DC converter, receiving the DC power, converting the DC power to the first output power, and outputting the first output power to the first power output end; and
a second DC converting unit, electrically connected to the AC/DC converter, receiving the DC power, converting the DC power to the second output power, and outputting the second output power to the the second power output end.

9. The power supply device with multiple outputs as claimed in claim 8, wherein
the first DC converting unit comprises a first step-down converter and a first controller, the second DC converting unit comprises a second step-down converter and a second controller, and the control module includes the first controller and the second controller; wherein;
the first controller is electrically connected to the first output port to detect the first demand power, and is electrically connected to the first switching module to control the first switching module; and
the second controller is electrically connected to the second output port to detect the second demand power, and is electrically connected to the second switching module to control the second switching module;
the first controller and the second controller are electrically connected to each other to transmit the first demand power and the second demand power to each other;
the first controller controls the first switching module according to the first demand power and the second demand power; and
the second controller controls the second switching module according to the first demand power and the second demand power.

10. A power allocating control method for a power supply device with multiple outputs, implemented by a power supply device comprising:
a first output port;
a second output port;
a power converting module providing a first output power with a first rated-power value, providing a second output power with a second rated-power value, and having
a first power output end outputting the first output power; and
a second power output end outputting the second output power; the first rated-power value being higher than the second rated-power value;
a first switching module electrically connected to the first power output end, the first output port, and the second output port; wherein the first switching module connects the first power output end to either one of the first output port and the second output port, connects the first power output end to both the first output port and the second output port, or disconnects the first power output end from both the first output port and the second output port; and
a second switching module electrically connected to the second power output end, the first output port, and the second output port; wherein the second switching module connects the second power output end to either one of the first output port and the second output port, connects the second power output end to both the first output port and the second output port, or disconnects the second power output end from both the first output port and the second output port; the control method comprising steps as follows:
when a first demand power of the first output port is detected, determining whether the first demand power is higher than the first rated-power value of the first power output end;
when the first demand power is higher than the first rated-power value, connecting the first power output end and the second power output end to the first output port rather than a second output port;
when the first demand power is not higher than the first rated-power value, further determining whether the first demand power is higher than the second rated-power value of the second power output end;
when the first demand power is not higher than the first rated-power value but higher than the second rated-power value, connecting the first power output end to the first output port rather than the second output port, and disconnecting the second power output end from the first output port and the second output port; and
when the first demand power is not higher than the second rated-power value, disconnecting the first power output end from the first output port and the second output port, and connecting the second power output end to the first output port rather than the second output port.

11. The power allocation control method as claimed in claim 10, wherein the method comprises:
when a second demand power of the second output port is further detected, determining whether the first demand power is higher than the second rated-power value;
when the first demand power is higher than the second rated-power value, connecting the first power output end to the first output port rather than the second output port, and connecting the second power output end to the second output port rather than the first output port; and
when the first demand power is not higher than the second rated-power value, connecting the first power output end to the second output port rather than the first output port, and connecting the second power output end to the first output port rather than the second output port.

* * * * *